G. W. & O. HENDERSON.
CORN HUSKING MACHINE.
APPLICATION FILED JUNE 1, 1912.

1,071,416.

Patented Aug. 26, 1913.

3 SHEETS—SHEET 1.

Witnesses

George W. Henderson and
Olen Henderson  Inventors by

Attorneys

G. W. & O. HENDERSON.
CORN HUSKING MACHINE.
APPLICATION FILED JUNE 1, 1912.
1,071,416.
Patented Aug. 26, 1913.
3 SHEETS—SHEET 2.
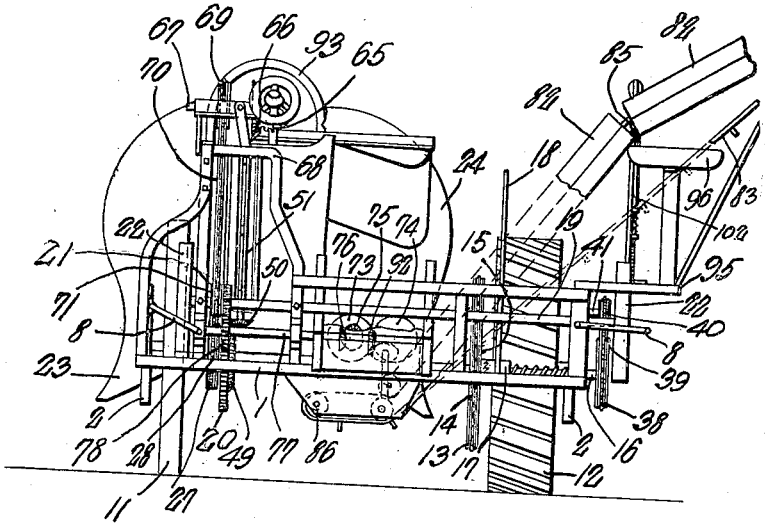
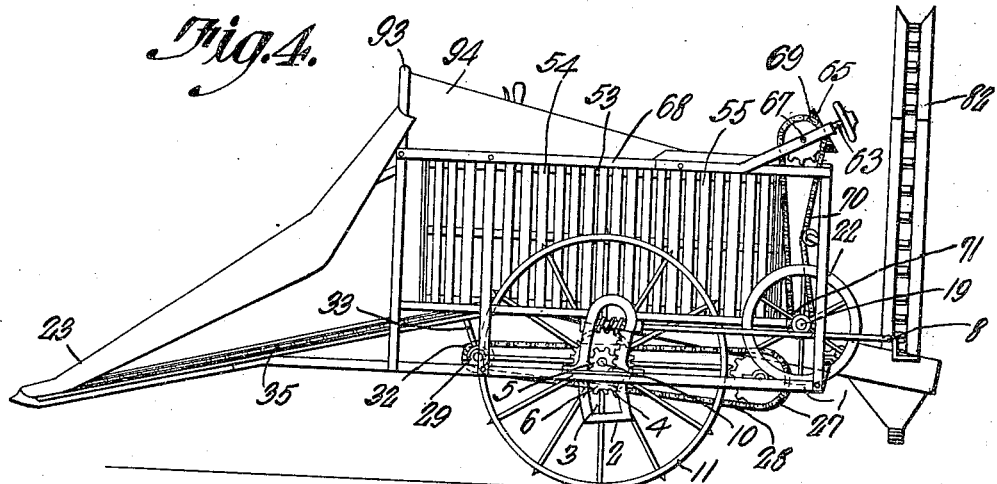

G. W. & O. HENDERSON.
CORN HUSKING MACHINE.
APPLICATION FILED JUNE 1, 1912.
1,071,416.
Patented Aug. 26, 1913.
3 SHEETS—SHEET 3.
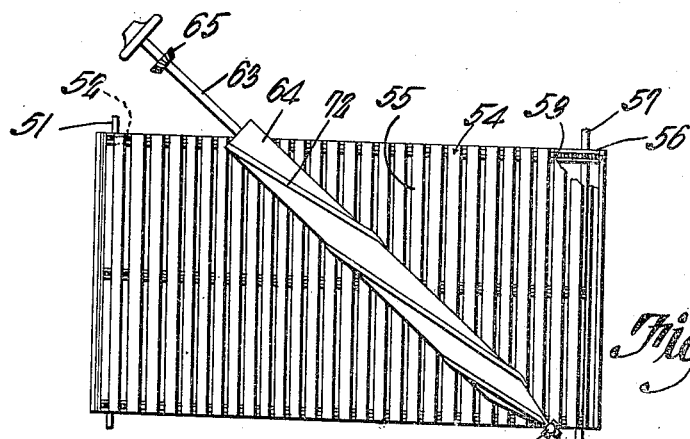
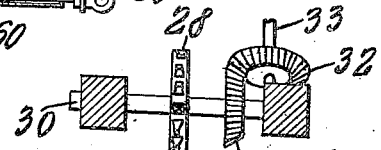
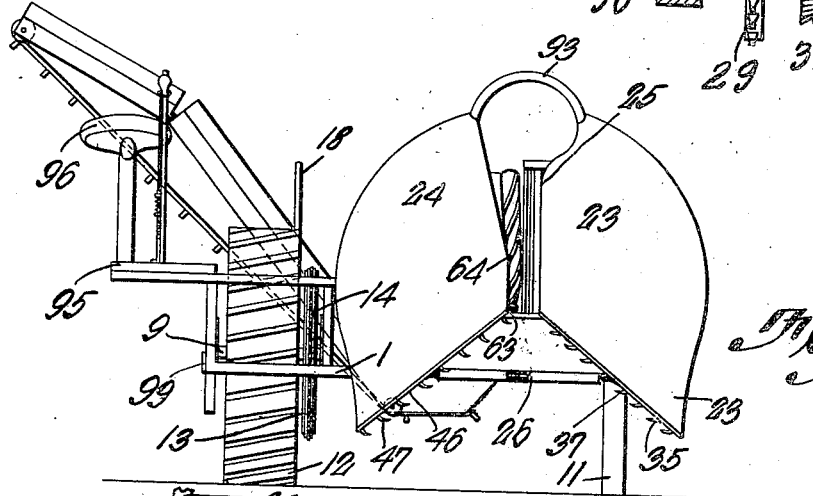
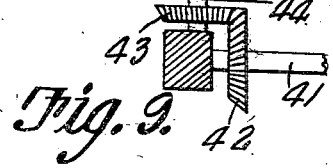
George W. Henderson and
Olen Henderson, Inventors
Witnesses
by
Attorneys

UNITED STATES PATENT OFFICE.

GEORGE W. HENDERSON AND OLEN HENDERSON, OF RIDGE FARM, ILLINOIS.

CORN-HUSKING MACHINE.

1,071,416.        Specification of Letters Patent.   Patented Aug. 26, 1913.

Application filed June 1, 1912. Serial No. 701,026.

*To all whom it may concern:*

Be it known that we, GEORGE W. HENDERSON and OLEN HENDERSON, citizens of the United States, residing at Ridge Farm, in the county of Vermilion, State of Illinois, have invented a new and useful Corn-Husking Machine, of which the following is a specification. -

This invention relates to machines for gathering and husking corn, one of its objects being to provide a machine of this character which will gather the corn without danger of snapping off the ears and dropping them on the ground before they have been husked.

Another object is to provide improved means for snapping the ears from the stalks and depositing them upon the husking rolls.

A further object is to provide means whereby the machine can be readily adjusted vertically so as to properly engage the corn to be harvested.

A further object is to provide a machine of this character which is light and durable in construction and which is easy to manipulate.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

Figure 1:
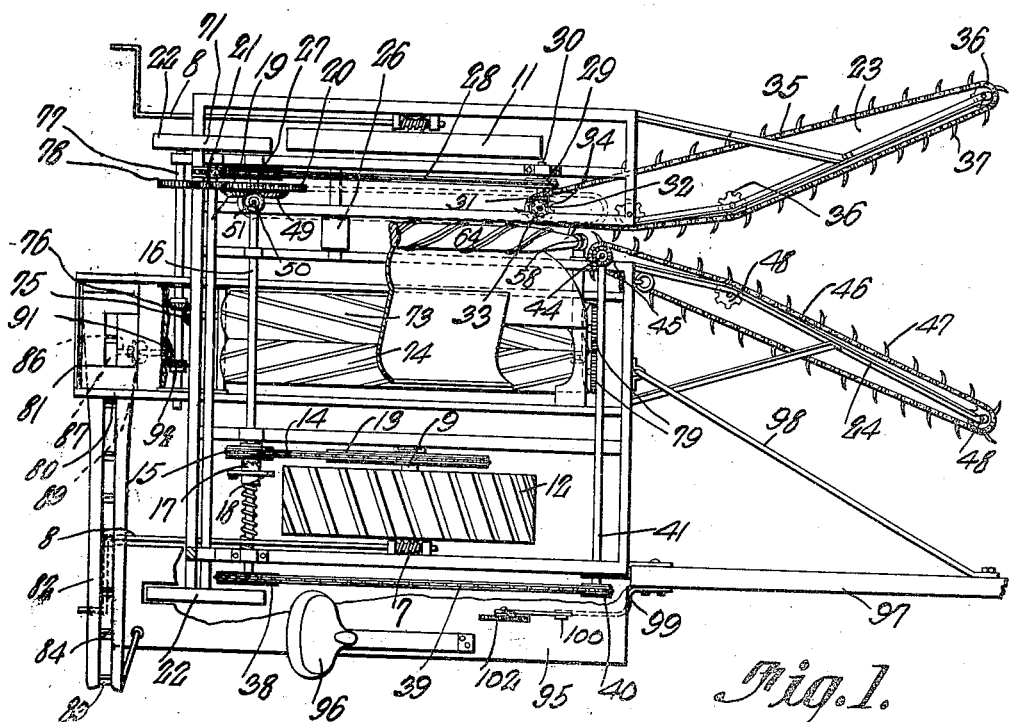
Figure 2:
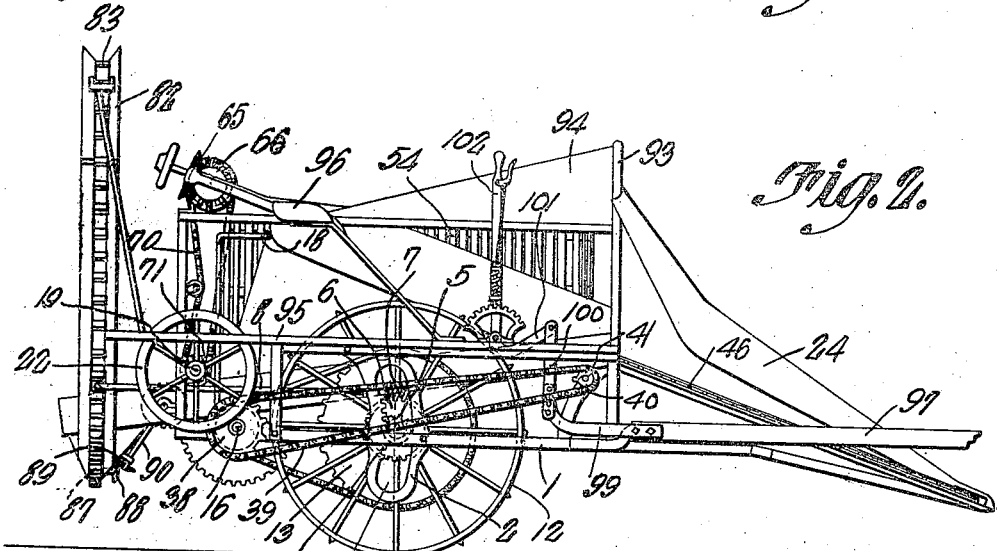

In said drawings:—Figure 1 is a plan view of the machine, parts being broken away. Fig. 2 is a side elevation. Fig. 3 is a rear elevation. Fig. 4 is an elevation of that side of the machine opposite to the side shown in Fig. 2. Fig. 5 is a front elevation.
Fig. 6 is an enlarged side elevation of the snapping mechanism. Fig. 7 is a view partly in section and partly in elevation of one of the bearings of the snapping roller. Fig. 8 is a detail view of a portion of the gearing. Fig. 9 is a detail view of another portion of the gearing.

Referring to the figures by characters of reference, 1 designates the base frame of the machine, the same being provided at its sides with guides 2 having arcuate slots 3, one of the walls of each slot being formed with rack teeth 4 which are adapted to be engaged by a gear 5. Each of these gears is secured to or formed with a worm wheel 6 which, in turn, is engaged by a worm 7 formed on or secured to one end of an actuating rod 8 extending rearwardly from the machine. One of these rods is of course located adjacent each side of the machine as shown in Fig. 1 and it will be apparent that by rotating the rods, the worm wheels 6 can be rotated and the gears 5 can be caused to travel upwardly or downwardly within the slots 3. These worm wheels 6 and gears 5 are secured to axles 9 and 10 respectively which are held normally against rotation by the worm wheel 6 and the worm 7. A supporting wheel 11 is mounted for rotation on the axle 10 and a main drive wheel 12 is mounted for rotation on the axle 9, this wheel 12 being provided with a large drive sprocket 13 secured thereto and adapted to rotate therewith. This sprocket transmits motion through a chain 14 to a sprocket 15 loosely mounted on a transversely extending shaft 16 journaled on the frame 1. A clutch 17 under the control of the driver is provided for coupling the sprocket 15 to or uncoupling it from the shaft 16. This clutch may be operated in any suitable manner, as by means of a lever 18. A counter shaft 19 is journaled on and extends transversely of the frame 1 and receives motion, through gears 20 and 21 from the shaft 16, said counter shaft being provided, at each end, with a fly wheel 22.

Extending forwardly from the frame 1 are diverging gathering members 23 and 24 the inner or active faces of which are preferably formed of sheet metal and diverge upwardly as well as forwardly. A stalk receiving throat 25 is formed between the rear portions of the gathering devices 23 and 24 and arranged within the frame 1 and back of the lower portion of this throat is a transversely extending roller 26 adapted to engage the stalks after the ears have been snapped therefrom and to press the stalks downwardly cut of the path of the machine.

A sprocket 27 is secured to and rotates with the shaft 16 and transmits motion, through a chain 28, to another sprocket 29 secured to a short transverse shaft 30 to which is secured a bevel gear 31. This bevel gear drives another gear 32 secured to a vertical shaft 33 located back of and at one side of the throat 25. A sprocket 34 is secured to the shaft 33 and engages an endless drag chain 35 which extends along the inner or advancing edge of one of the gathering devices 23, said chain being mounted on guide sprockets 36 located at suitable points upon the gathering device. Teeth 37 extend outwardly from the chain for engaging the corn stalks and drawing them inwardly toward the throat 25.

A sprocket 38 is secured to and rotates with shaft 16 and transmits motion through a chain 39 to another sprocket 40 secured to one end of a transverse shaft 41. This shaft has a gear 42 which meshes with and is adapted to actuate another gear 43 connected to a vertical shaft 44, there being a sprocket 45 secured to said shaft and which is adapted to drive a drag chain 46 which extends along the inner or advancing edge of the gathering member 24 and has outstanding stalk engaging teeth 47. Guide sprockets 48 are arranged at suitable points upon the gathering device 24 so as to hold the chain 46 in proper position while operating. It is to be understood that the shafts 33 and 44 are located at opposite sides of the throat 25 and that, by providing mechanism such as described, the two chains 35 and 46 travel in opposite directions simultaneously.

A bevel gear 49 is secured to and rotates with the shaft 16 and meshes with a bevel gear 50 secured to a vertical shaft 51. This shaft has sprockets 52 secured thereto which engage chains 53 forming parts of an endless apron 54, said chains being connected by parallel vertical slats 55. The chains 53 are also mounted on sprockets 56 secured to another vertical shaft 57 located back of and close to the throat 25. The upstanding apron 54 extends rearwardly from one side of the throat and it will be apparent that by providing the mechanism described, the inner or active flight of this apron will move rearwardly.

A bearing block 58 is arranged close to the front end portion of the apron 54 and adjacent the lower edge of the apron, this block being connected to one end of a rod 59 which is mounted to slide within a guide casing 60 extending transversely of the machine. A spring 61 is housed within the casing and bears against rod 59 so as to hold the block 58 normally pressed yieldingly toward the apron 54. The tension of spring 61 can be increased as desired by means of a threaded stem 62 mounted in one end of the casing 60.

Journaled within the block 58 is the lower end of a shaft 63 carrying a snapping roller 64 the lower end of which is tapered, as shown particularly in Fig. 6. This shaft, and the snapping roller, are extended upwardly and rearwardly close to the apron 54, the upper end portion of the shaft being provided with a bevel gear 65 receiving motion, through a gear 66 from a shaft 67 mounted on the superstructure 68 of the machine. This shaft 67 has a sprocket 69 secured thereto which receives motion, through a chain 70, from a sprocket 71 secured to the counter shaft 19. Thus it will be seen that, as the machine moves forward, the snapping roller 64, which is provided with a spiral rib 72, will coöperate with the rearwardly moving flight of the apron 54, to remove the ears from the stalks and drop them into the space below and at one side of the roller 64.

Arranged below and at one side of the snapping roller are parallel longitudinally extending husking rolls 73 and 74 one of which has a bevel gear 75 secured to its shaft which meshes with a gear 76 secured to a transversely extending shaft 77. A spur gear 78 is secured to the shaft 77 and meshes with the spur gear 20. The front ends of the shafts of the husking rollers 73 and 74 are provided with meshing gears 79 so that the two rolls are caused to revolve simultaneously in opposite directions, the ribs thereon engaging the husks and removing them from the ears. A spout 80 serves to discharge the husked ears into a hopper 81 located at the back end of the machine and from which extends an elevator casing 82 which projects upwardly and laterally. An elevator belt 83 is movably mounted within the casing 82 and is preferably formed with slats 84 for engaging the ears and carrying them upwardly to the point of discharge. If desired, and as shown in Fig. 3, the elevator casing 82 can be made up of two sections hingedly connected as shown at 85 so that the said elevator casing can thus be folded into a compact space when the machine is not in use. The means provided for actuating the elevator belt consists of a shaft 86 having a roller or the like such as shown at 87 for driving the apron or belt 83. A gear 88 is secured to the shaft 86 and meshes with another gear 89 carried by a shaft 90 which receives motion, through gears 91 and 92 from the shaft 77.

For the purpose of protecting the working parts of the machine and preventing injury to the driver, an elongated yoke 93 is erected at the rear ends of the gathering devices 23 and 24 and supports a hood 94 which extends rearwardly over the snapping apron 54 and the snapping roller 64 and also extends downwardly so as to completely house the side portions of the snapping and husking mechanism.

A platform 95 is arranged at one side of the machine and the driver's seat 96 is mounted thereon. A draft tongue 97 is connected to the front end of the machine close to the platform 95 and a draw rod 98 connects the tongue to the middle portion of the front end of frame 1. The draw rod and the tongue are pivotally connected to the frame and an arm 99 extends rearwardly from the tongue 97 and is pivotally connected, as by means of a link 100, to an arm 101 extending from the lower end of an adjusting lever 102 which is arranged close to the seat 96 where it can be conveniently reached and actuated by the driver. It will be apparent that by manipulating this lever the tongue 97 can be swung vertically relative to the frame 1 and the gathering devices 23 and 24 thus raised or lowered at their front ends so as to engage and lift the stalks. By providing the adjusting mechanism shown at 2, 3, and 4 to 8, the entire machine can be raised or lowered so that it can be operated with its bottom parallel with the ground. This adjustment is especially advantageous where the machine is to be used in a field of fallen stalks.

From the foregoing description it will be obvious that, as the machine is drawn forward, the wheel 12 will operate the various parts of the mechanism provided the clutch 17 is in engagement with the clutch member on the sprocket 15 so as to couple said sprocket to the shaft 16. The teeth on the drag chains 35 and 46 will engage the stalks and draw them backwardly between the gathering devices 23 and 24 and said stalks will enter the space between the lower tapered end of the snapping roller 64 and the snapping apron 54. As the stalks move rearwardly relative to these parts, the spiral ribs on the snapping roller will coöperate with the slats on the apron 54 so as to remove the ears from the stalks. The stalks will then come against the roller 26 and will be forced downwardly thereby from between the snapping roll and the apron 54 so as to permit the machine to pass over them. The ears, when detached, will fall onto the husking rolls 73 and 74 and the husked ears will be discharged from these rolls into the hopper 81 from which they will be conveyed by the belt or apron 83 to the point of discharge at one side of the machine.

What is claimed is:—

1. A corn harvester including gathering devices forming a throat therebetween, an upstanding endless apron extending rearwardly from one side of the throat, and a snapping roll said roll and apron coöperating simultaneously to engage opposed portions of an ear.

2. A corn harvesting machine including gathering devices forming a throat therebetween, an endless apron arranged vertically back of the throat, the active flight of the apron being movable rearwardly from the throat, a snapping roll extending upwardly adjacent to and coöperating with a vertical face of the apron and means for actuating the apron and rotating the snapping roll.

3. A corn harvesting machine including gathering devices forming a throat therebetween, an endless apron arranged vertically back of the throat, the active flight of the apron being movable rearwardly from the throat, an upwardly and rearwardly inclined snapping roll extending upwardly adjacent to and coöperating with a vertical face of the apron and means for actuating the apron and rotating the snapping roll.

4. A corn harvesting machine including gathering devices forming a throat therebetween, an endless apron arranged vertically back of the throat, the active flight of the apron being movable rearwardly from the throat, an upwardly and rearwardly inclined snapping roll adjacent to and coöperating with a vertical face of the apron, the forward end of the roll being tapered and coöperating with the apron to form an angular stalk receiving space and means for actuating the apron and rotating the snapping roll.

5. A corn harvester including gathering devices, a snapping apron having its active flight normally vertical and movable rearwardly from the gathering devices, an upwardly and rearwardly inclined snapping roll adjacent to and coöperating with a vertical face of the apron and means for actuating the apron and rotating the snapping roll.

6. A corn harvester including gathering devices, a snapping apron having its active flight normally vertical and movable rearwardly from the gathering devices, an upwardly and rearwardly inclined snapping roll adjacent to and coöperating with a vertical face of the apron, means for pressing the forward end of said roll yieldingly toward the apron and means for actuating the apron and rotating the snapping roll.

7. A corn harvester including gathering devices, a snapping apron having its active flight normally vertical and movable rearwardly from the gathering devices, an upwardly and rearwardly inclined snapping roll adjacent to and coöperating with a vertical face of the apron, means for pressing the forward end of said roll yieldingly toward the apron, said end of the roll being tapered and coöperating with the apron to form a tapered stalk receiving space and means for actuating the apron and rotating the snapping roll.

8. A corn harvester including gathering devices forming a throat therebetween, oppositely moving drag chains carried by the respective devices for directing stalks into the throat, a vertical snapping apron extending from the throat, the active flight of the apron being movable rearwardly from said throat, an upwardly and rearwardly inclined snapping roll adjacent to and coöperating with the active face of said flight and means for actuating the apron and rotating the snapping roll.

9. A corn harvester including rearwardly converging gathering devices forming a stalk receiving throat, drag chains carried by said devices for directing stalks into the throat, a vertical endless apron back of the throat, the active flight of the apron being movable rearwardly from the throat, said apron being made up of spaced parallel slats, flexible connections between the slats, and a snapping roll adjacent to and coöperating with a vertical face of the apron and means for actuating the apron and rotating the snapping roll.

10. A corn harvester including rearwardly converging gathering devices forming a stalk receiving throat, means for directing stalks into the throat, a snapping apron having vertical slats movable rearwardly from the throat, an upwardly and rearwardly inclined snapping roll adjacent to and coöperating with the vertical face of the active flight of the apron, and means for simultaneously actuating the apron and rotating said roll.

11. A corn harvester including rearwardly converging gathering devices forming a stalk receiving throat, means for directing stalks into the throat, a snapping apron having vertical slats movable rearwardly from the throat, an upwardly and rearwardly inclined snapping roll adjacent to and coöperating with the vertical face of the active flight of the apron, and means operated by the forward movement of the machine, for simultaneously actuating the apron and rotating the roll.

12. A corn harvester including rearwardly converging gathering devices forming a stalk receiving throat, means for directing stalks into the throat, a snapping apron having vertical slats movable rearwardly from the throat, an upwardly and rearwardly inclined snapping roll adjacent to and coöperating with a vertical face of the active flight of the apron, yielding means for automatically pressing the snapping roll toward the active flight of the apron and means for actuating the apron and rotating the snapping roll.

13. A corn harvester including rearwardly converging gathering devices forming a throat therebetween, means for directing stalks into the throat, a snapping apron having vertically disposed slats, the active flight of the apron being movable rearwardly from the throat, an upwardly and rearwardly inclined snapping roll adjacent to and coöperating with the vertical face of the active flight of the apron, means for actuating the apron and rotating said roll, and coöperating husking rolls below and adapted to receive ears from the snapping roll.

14. A corn harvester including rearwardly converging gathering devices forming a throat therebetween, an endless snapping apron having a normally vertical active flight movable rearwardly from the throat, an upwardly and rearwardly inclined snapping roll adjacent to and coöperating with the vertical face of said flight, coöperating husking rolls below and at one side of the snapping roll for receiving ears therefrom, an elevator, means for directing ears from the husking rolls to the elevator and means for actuating the apron and rotating the snapping roll.

15. A corn harvester including supporting wheels, a frame carried thereby, means for adjusting the frame vertically relative to the wheels, gathering devices carried by the frame and converging rearwardly to form a throat, an endless snapping apron having a vertical rearwardly moving flight back of the throat, a rearwardly and upwardly inclined snapping roll adjacent to and coöperating with the vertical face of the active flight of said apron, and means operated by one of said supporting wheels for simultaneously actuating the apron and snapping roll.

16. In a corn harvester the combination with supporting wheels, and a frame carried thereby, of a draft tongue pivotally connected to the frame, gathering devices extending forwardly from the frame and converging rearwardly to form a stalk receiving throat, a snapping apron having a vertical rearwardly movable active flight, an upwardly and rearwardly inclined snapping roll adjacent to and coöperating with the vertical face of said flight, means under the control of the driver for swinging the frame and tongue relative to each other to adjust the gathering devices angularly relative to the surface on which the machine is mounted and means for actuating the apron and rotating the snapping roll.

In testimony that we claim the foregoing as our own, we have hereto affixed our signatures in the presence of two witnesses.

GEORGE W. HENDERSON.
OLEN HENDERSON.

Witnesses:
JOHN W. ENOS,
EVERETT C. SMITH.